US012673290B2

(12) United States Patent
Crepain et al.

(10) Patent No.: US 12,673,290 B2
(45) Date of Patent: Jul. 7, 2026

(54) DRYER FOR COMPRESSED GAS, COMPRESSOR INSTALLATION PROVIDED WITH A DRYER AND A METHOD FOR DRYING COMPRESSED GAS

(71) Applicant: ATLAS COPCO AIRPOWER, NAAMLOZE VENNOOTSCHAP, Wilrijk (BE)

(72) Inventors: Thibault Crepain, Wilrijk (BE); Geert Hellemans, Wilrijk (BE); Hans Hermans, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 971 days.

(21) Appl. No.: 17/631,734

(22) PCT Filed: Aug. 14, 2020

(86) PCT No.: PCT/IB2020/057663
§ 371 (c)(1),
(2) Date: Jan. 31, 2022

(87) PCT Pub. No.: WO2021/033101
PCT Pub. Date: Feb. 25, 2021

(65) Prior Publication Data
US 2022/0274054 A1 Sep. 1, 2022

(30) Foreign Application Priority Data

| Aug. 16, 2019 | (BE) | ..................................... | 2019/5536 |
| Aug. 16, 2019 | (BE) | ..................................... | 2019/5537 |
| Aug. 16, 2019 | (BE) | ..................................... | 2019/5538 |

(51) Int. Cl.
*B01D 53/06* (2006.01)
*B01D 53/04* (2006.01)
(Continued)

(52) U.S. Cl.
CPC ......... *B01D 53/06* (2013.01); *B01D 53/0454* (2013.01); *B01D 53/261* (2013.01);
(Continued)

(58) Field of Classification Search
CPC .... B01D 53/06; B01D 53/0454; B01D 53/30; B01D 53/261; B01D 2257/80; B01D 2259/4009
See application file for complete search history.

(56) References Cited

U.S. PATENT DOCUMENTS

| 3,252,273 A | 5/1966 | Stephens |
| 3,708,956 A | 1/1973 | Norback |

(Continued)

FOREIGN PATENT DOCUMENTS

| CN | 201058269 Y | 5/2008 |
| CN | 102612399 A | 7/2012 |

(Continued)

OTHER PUBLICATIONS

Chinese Office Action in corresponding Chinese Application No. 202010081125.7, dated May 30, 2022.
(Continued)

*Primary Examiner* — Robert Clemente
(74) *Attorney, Agent, or Firm* — BACON&THOMAS, PLLC

(57) ABSTRACT

Dryer for a compressed gas includes a pressure vessel containing a drying zone and a regeneration zone, a drum provided with regenerable drying agent, an inlet for the supply of the compressed gas to be dried to the drying zone, an outlet for the expulsion of dried compressed gas, a first connection line for branching off a partial stream of the compressed gas to be dried or the dried compressed gas and conducting this partial stream to the regeneration zone, adjustable means for the combination of the partial stream (Continued)

with the supply stream and regulation of the flow from the partial stream with regard to the supplied stream, at least one sensor for measuring at least one measurement value with regard to the function of the dryer, a control unit for processing of the at least one measurement value and installation of a control signal on the adjustable means.

18 Claims, 7 Drawing Sheets

(51) Int. Cl.
  *B01D 53/26* (2006.01)
  *B01D 53/30* (2006.01)

(52) U.S. Cl.
  CPC .......... *B01D 53/30* (2013.01); *B01D 2257/80* (2013.01); *B01D 2259/4009* (2013.01)

(56) References Cited

U.S. PATENT DOCUMENTS

| | | | |
|---|---|---|---|
| 3,925,046 | A | 12/1975 | Hickey et al. |
| 5,385,603 | A | 1/1995 | Sienack |
| 5,688,305 | A | 11/1997 | Graeff |
| 6,447,583 | B1 * | 9/2002 | Thelen ................. B01D 53/261 |
| | | | 96/125 |
| 2003/0121271 | A1 | 7/2003 | Dinnage et al. |
| 2010/0281893 | A1 | 11/2010 | Wheeler |
| 2015/0251129 | A1 | 9/2015 | Heirman et al. |
| 2018/0154302 | A1 | 6/2018 | Vertriest et al. |
| 2022/0161186 | A1 * | 5/2022 | Van Nederkassel ... B01D 53/06 |

| | | | |
|---|---|---|---|
| 2022/0212137 | A1 * | 7/2022 | Hellemans ............. B01D 53/06 |
| 2022/0241718 | A1 * | 8/2022 | Hellemans ........... B01D 53/261 |
| 2022/0241720 | A1 * | 8/2022 | Hellemans ............. B01D 53/06 |

FOREIGN PATENT DOCUMENTS

| | | | |
|---|---|---|---|
| CN | 202446968 | U | 9/2012 |
| CN | 104548886 | A | 4/2015 |
| CN | 107257707 | A | 10/2017 |
| CN | 107970748 | A | 5/2018 |
| DE | 3909543 | A1 | 9/1990 |
| EP | 0191007 | A2 | 8/1986 |
| JP | 2001179034 | A | 7/2001 |
| JP | 6023228 | B2 | 11/2016 |
| KR | 10-1520319 | | 5/2015 |
| WO | 0074819 | A1 | 12/2000 |
| WO | 2011050423 | A2 | 5/2011 |
| WO | 2012147153 | A1 | 1/2012 |
| WO | 2015039193 | A2 | 3/2015 |

OTHER PUBLICATIONS

International Search Report and Written Opinion in corresponding PCT Application No. PCT/IB2020/057633, dated Dec. 17, 2020.
BE Search Report in corresponding BE Application No. 201905536, dated Apr. 8, 2020.
BE Search Report in corresponding BE Application No. 201905538, dated Mar. 20, 2020.
BE Search Report in corresponding BE Application No. 201905537, dated Apr. 14, 2020.
Chinese Office Action in corresponding Chinese Application No. 202010081125.7, dated Dec. 9, 2022.
Japanese Office Action in corresponding Japanese Application No. 2022-509660, dated Nov. 5, 2023.

* cited by examiner

DRYER FOR COMPRESSED GAS, COMPRESSOR INSTALLATION PROVIDED WITH A DRYER AND A METHOD FOR DRYING COMPRESSED GAS

FIELD OF THE INVENTION

The current invention involves a dryer for compressed gas, a compressor installation provided with this type of dryer and a method for drying of the compressed gas, such as air.

BACKGROUND OF THE INVENTION

There are already dryers for compressed gas known, such dryers that are equipped with a pressure vessel with a drying zone and a regeneration zone and possibly a cooling zone, and a rotating drum in the pressure vessel with a regenerable drying agent. The pressure vessel contains an intake for the supply of the compressed gas to be dried to the drying zone and an outlet for the removal of dried gas. A warm regeneration gas is conducted to the regeneration zone for regeneration of the drying agent. The dryer also contains drive units for the rotation of the drum such that the drying agent subsequently moves through the drying zone and the regeneration zone.

The compressed gas heated by the compression and therefore has a low relative humidity, can be used as a regeneration gas for the regeneration of the drying agent. In a first known design, a part of the supply flow of the compressed gas is tapped off for the regeneration and then re-added to the flow of compressed gas via a connection line. In a second known design, a part of the supply flow of the compressed gas is tapped off and heated for the regeneration and then re-added to the flow of compressed gas via a connection line. In a third known design, the entire supply flow is to be dried, compressed gas is first conducted through the regeneration zone and then through the drying zone.

There are other designs known, such as in WO 2015/039193 A2.

It is known to combine the partial stream used for regeneration with the supply stream of the compressed gas to be dried, before the inlet side of the drying zone. In this, use is made of a venturi ejector or a blower to create a pressure difference that maintains the partial stream.

SUMMARY OF THE INVENTION

One objective of the invention is to rectify one or more disadvantages described above.

The objective of the invention is to create a dryer or drying unit for a compressed gas which with the function of the dryer can be better controlled using simple means.

The compressed gas is air, for example, but could also be another gas. The dried gas can be used in a downstream compressed air network for all kinds of uses, such as for pneumatic transport, driving pneumatically driven tools and the like.

According to a first aspect of the invention, whether or not in combination with other aspects or designs described herein, the invention creates a dryer or drying unit for the drying of compressed gas, comprising a pressure vessel with a rotation symmetrical (such as cylindrical) part containing a drying zone and a regeneration zone, a drum within the rotation symmetrical part, equipped with a regenerable drying agent; driving means for rotating the aforementioned drum within the rotation symmetrical part, meaning for rotating the drum and/or the rotation symmetrical part, so that the drying agent is successively moved through the drying zone and the regeneration zone, an inlet for the supply of the compressed air to be dried to the drying zone, an outlet for the removal of the dried compressed gas, and a first connection line for branching off of a partial stream of the dried compressed gas and transfer of this partial stream to the regeneration zone. The dryer also contains adjustable means, provided for the combination of the partial stream used for regeneration with the supply stream of the compressed gas to be dried and the regulation of the flow of the partial stream with regard to the supply stream, with at least one sensor for measuring at least on measurement value regarding the function of the dryer, and a control unit, connected to communicate with the at least one sensor and the aforementioned adjustable means and equipped for the processing of the at least one measurement value, the determination of a control signal for the aforementioned adjustable means based on the at least one measurement value and the installation of the control signal on the aforementioned adjustable means. Using one or more measurement values, the control unit, by adjusting the control signal and as a result at least the flow of the partial flow for regeneration, can influence the function of the dryer for achieving, for example, a desired value for the pressure dewpoint and/or a desired stability of the pressure dewpoint within a well determined range.

In designs of the invention, the sensor set has one or more sensors for the direct or indirect measurement of the flow of the supply stream and/or the partial stream. The control unit can be provided for the evaluation of the direct or indirect measured flow of the supply stream and/or the partial stream and the adjustment of the control signal on the basis of this evaluation. The sensor set can include an RPM sensor for measuring of the speed of a compressor that provides the supply stream, which is a measurement for the flow of the supply stream and/or pressure sensors for to measure a fall in pressure using the adjustable means, which is a measurement f or the flow of the partial stream used for regeneration.

In designs of the invention, the sensor set can include one or more of the following sensors: temperature sensors for measuring a temperature difference between the inlet side and outlet side of the regeneration zone, temperature sensors for measuring a temperature difference between the inlet side and outlet side of the drying zone, a pressure dewpoint sensor at the level of the outlet for the measurement of a pressure dewpoint of the discharged stream of dried compressed gas.

In designs of the invention, the first connection line is equipped with a heat exchanger for heating the partial stream diverted for regeneration with the compressed gas to be dried supplied to the dryer, and that the sensor set has at least one or more of the following sensors: pressure sensors for measuring a pressure difference between the outlet side of the drying zone and the inlet side of the regeneration zone, pressure sensors for measuring a loss of pressure caused by the heat exchanger in the partial stream and/or the supply stream.

In designs of the invention, the dryer can have at least one cooling unit provided for the cooling of the compressed gas in the supply stream, the partial stream used for regeneration and/or the combined stream, and that the sensor set has at least one or more of the following sensors: temperature sensors for measuring the temperature of the relevant stream before and/or after the relevant cooling unit, pressure sensors for measuring a drop in pressure caused by the relevant cooling unit in the relevant stream, temperature sensors for measuring the temperature of the a coolant used for cooling before and/or after the cooling unit.

In designs of the invention, the adjustable means can include a venturi ejector positioned to unite the partial stream and the supply stream and provided with an adjustable opening and an actuator for the actuation of the adjustable opening based on the control signal.

In designs of the invention, the control unit can be connected to communicate with the actuators for the rotation of the drum with regard to the symmetrical rotation part of the pressure vessel, and that the control unit is provided for the determination of a second control signal for these actuators based on the at least one measurement value and the application of the second control signal on these actuators.

In designs of the invention, the control unit can be connected to communicate with one or more of the at least one cooling unit and is provided for the determination of at least a third control signal for this at least one cooling unit based on the at least one measurement value and the installation of the third control signal on the relevant cooling unit.

According to a second aspect of the invention, whether or not in combination with other aspects or designs described herein, the invention creates a dryer or drying unit for the drying of compressed gas, comprising a pressure vessel with a rotation symmetrical (such as cylindrical) part containing a drying zone and a regeneration zone, a drum within the rotation symmetrical part, equipped with a regenerable drying agent; driving means for rotating the aforementioned drum within the rotation symmetrical part, meaning for rotating the drum and/or the rotation symmetrical part, so that the drying agent is successively moved through the drying zone and the regeneration zone, an inlet for the supply of the compressed air to be dried to the drying zone, an outlet for the removal of the dried compressed gas, and a first connection line for branching off of a partial stream of the dried compressed gas and transfer of this partial stream to the regeneration zone. The actuators for rotating the aforementioned drum with regard to the symmetrical rotation part include a motor, preferably an electric motor equipped with a start/stop switch, preferably for the rotation of the drum.

The start/stop switch is provided to switch the motor on and off, to achieve an adjustable average rotation speed of the drum with regard to the symmetrical rotational part.

More precisely, the start/stop switch is provided to switch the motor on and off during the preferably continual function of the dryer, whereby on the one side, a continual flow of compressed gas is supplier and dried in the drying zone and on the other hand, a continual (partial) stream of the compressed gas to be dried is conducted to the regeneration zone for the regeneration of the drying agent. This start/stop switch is more economically beneficial than a frequency regulator to adjust the rotation speed of an electric motor and can thus be a cost saving in the area of investment costs. In addition, a start/stop switch is less complex, because it contains fewer control electronics. In addition, the start/stop switch makes it possible to have the drum rotate in phases with regard to the symmetrical rotation part, and so, for example, constantly precisely move one section the size of the regeneration zone or a part of it, and this section can then be stopped for a certain period. The start/stop switch has the additional advantage that the range of the average speed is broader than with a frequency regulator, namely, the average speed can be adjusted from 0 to the maximum speed of the motor.

According to designs of the invention, the start/stop switch can be controlled by the same control unit as described here elsewhere, using the second control signal that can be determined by this control unit based on the measurement values of the sensor set.

Additional aspects of a dryer according to the invention are those presented below.

An additional aspect of the invention involves a compressor installation, comprising a compressor and a dryer according to one of the aspects or designs described herein.

An additional aspect of the invention involves a method for drying a compressed gas, using a dryer according to one of the aspects or designs described herein.

BRIEF DESCRIPTION OF THE DRAWINGS

The invention will be explained in more detail using the drawings of the design examples according to the invention.

DETAILED DESCRIPTION OF THE INVENTION

Figure 1:
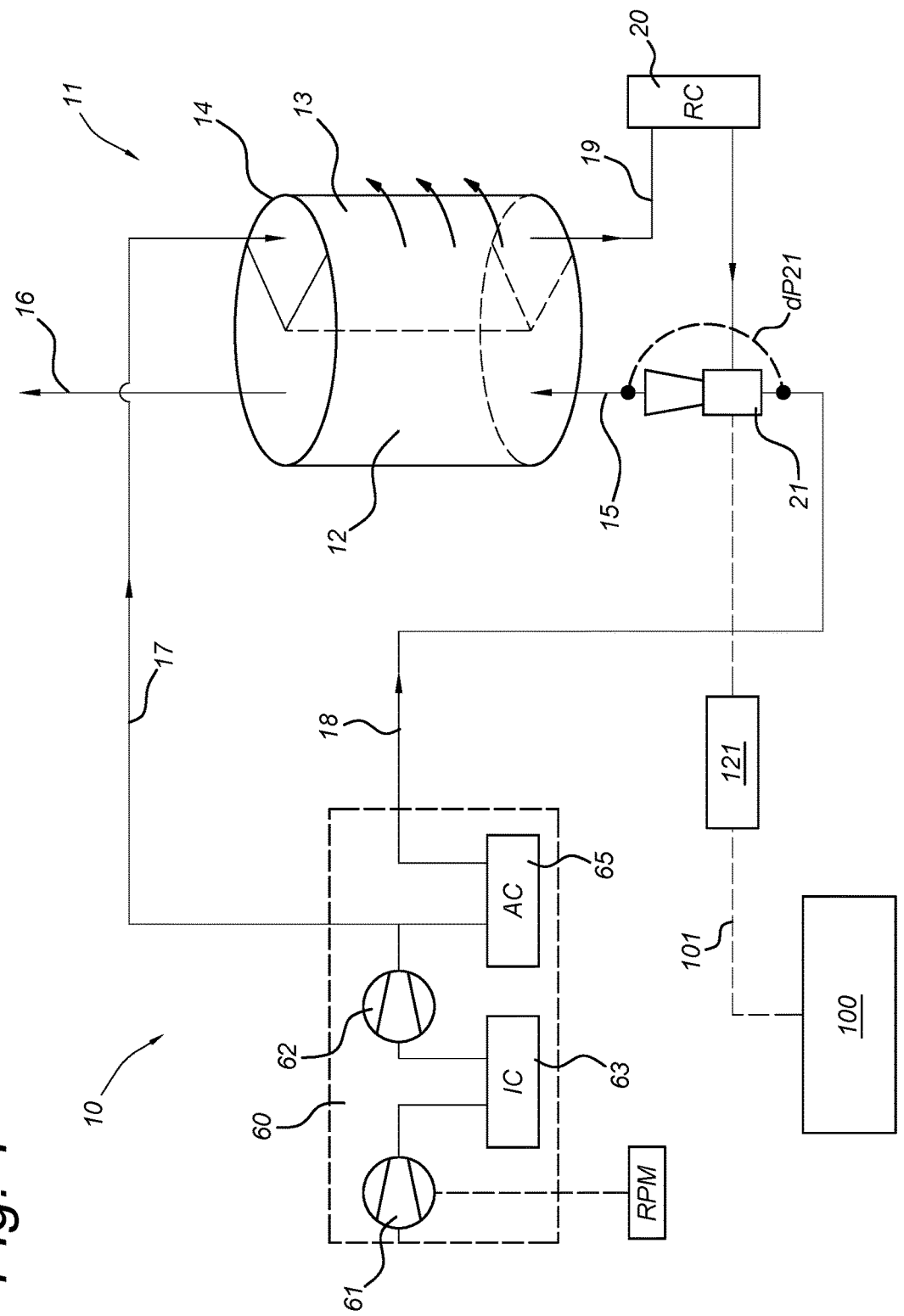
FIG. 1 shows a first design of a compressor installation including a dryer according to the invention.

The current invention will be described with regard to particular designs and with reference to certain figures, but the invention is not limited to these and is only determined by the conclusions. The figures described are only schematic and non-limiting. In the figures, the size of certain element is exaggerated and not drawn to scale for illustrative purposes. The dimensions and the relative dimensions are not necessarily consistent with actual practical designs of the invention.

In addition, the terms first, second, third and the like are used in the description and conclusions to differentiate between similar elements and not necessarily to describe a sequential or chronological sequence. The terms are interchangeable under fitting circumstances and the designs of the invention can be applied in sequences other than those described or illustrated here.

In addition, the terms, top, bottom, over, under and the like in the description and conclusions are used for illustrative purposes and not necessarily to describe relative positions. The terms used are interchangeable under fitting circumstances and the designs of the invention described can be applied in other orientations than described or illustrated here.

Furthermore, the various designs, even though called "preferred designs" must be considered rather as a manner of example of how the invention can be designed than as a limitation of the range of the invention.

The term "encompassing", used in the conclusions, must not be interpreted as being limited to the resources or steps listed after it. The term does not exclude other elements or steps. The term should be interpreted as specifying for the presence of the listed features, elements, steps or components which are referenced, but does not exclude the presence or addition of one or more other features, elements, steps or components or groups thereof. The range of the expression "a design encompassing resources A and B" must thus not be limited to designs that consist only of A and B. The intention is that, with regard to the current invention, only the components A and B of the design are summarized, and the conclusion must be further interpreted as they also contain equivalents of these components.

The designs shown of compression installations according to FIG. 1 through 5 also include a compressor 60 with a dryer 10; 30; 50; 70; 90 for compressed gas. The dryer comprises a pressure vessel 11 containing a rotation symmetrical part in which a drying zone 12 and a regeneration zone 13 are defined, a drum 14, set up in the rotation symmetrical part and equipped with a regenerable drying agent, driving means for rotating the aforementioned drum in the rotation symmetrical part, meaning to rotate the drum 14 in the rotation symmetrical part or making the rotation symmetrical part rotate around a stationary drum 14, so that the drying agent successively moves through the drying zone and the regeneration zone. The rotation symmetrical part is preferably cylindrical, but this is not essential, other forms of rotation symmetrical parts are also possible. The dryer also contains an inlet 15 connected to an inlet side of the crying zone of the pressure vessel 11 and equipped for the supply of the compressed gas to be dried and an outlet 16 connected to an outlet side of the drying zone of the pressure vessel 11 provided for the expulsion of the dried compressed gas. The input gas to be dried is delivered by a compressor 60 that can include a first compression stage 61 and a second compression stage 62 and an intercooler (IC) 63. The supply line of the compressor 60 to the inlet 15, the compressed gas first passes along a heat exchanger (HE) 64 and a/or cooling element (aftercooler AC) 65.

Figure 2:
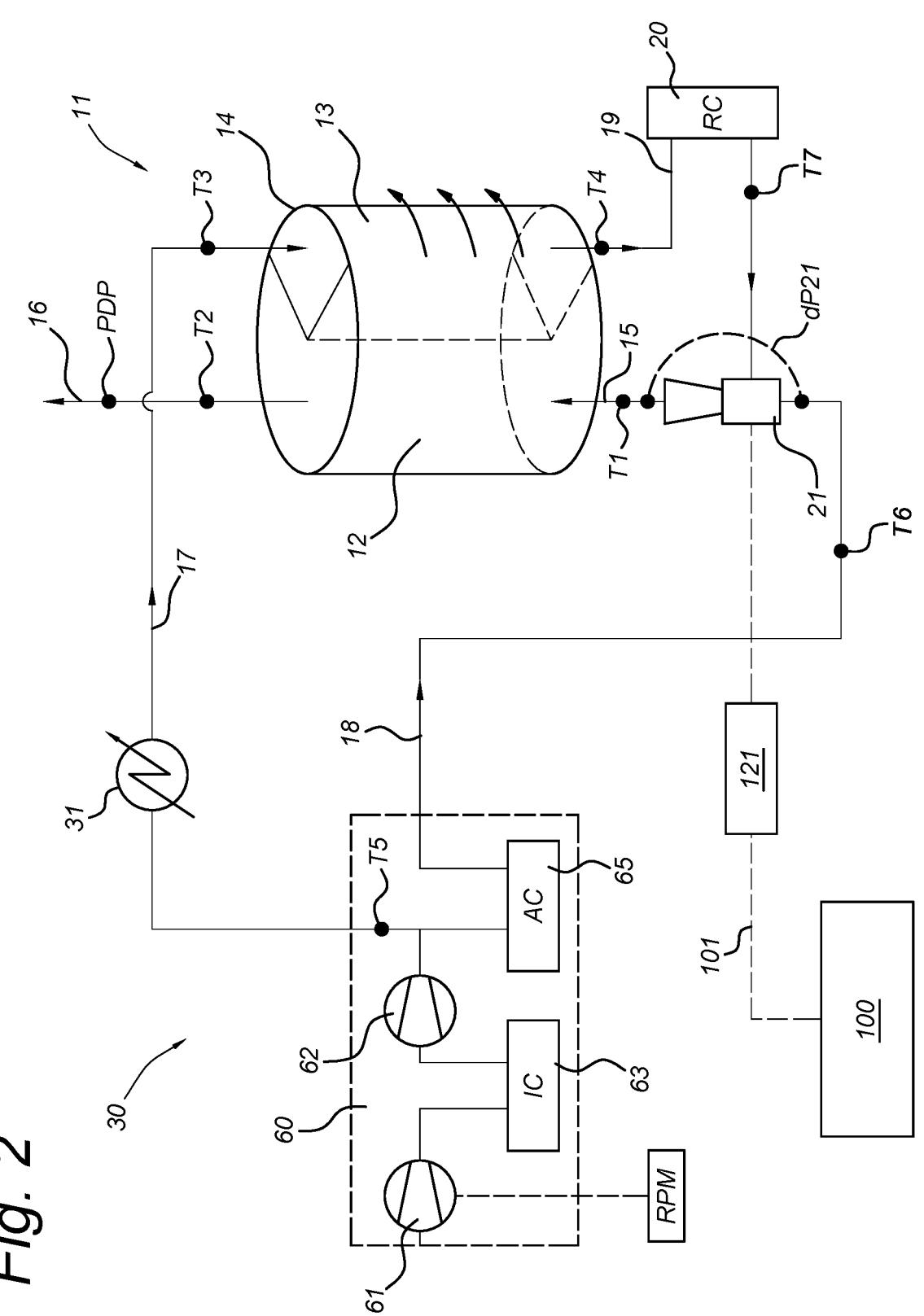
FIG. 2 shows a second design of a compressor installation including a dryer according to the invention.
Figure 3:
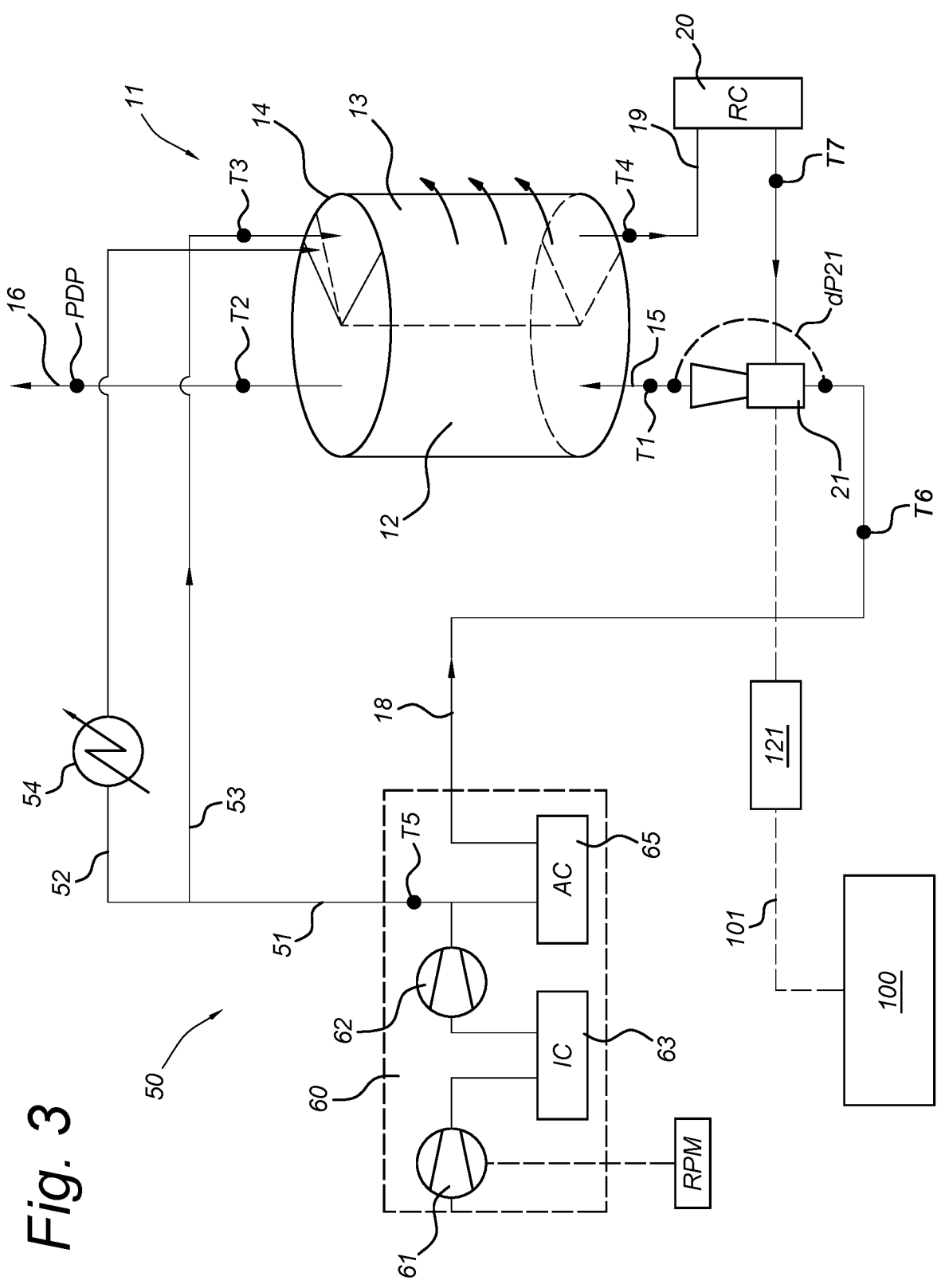
FIG. 3 shows a third design of a compressor installation including a dryer according to the invention.

In the designs according to FIG. 1 through 3, a part of the compressed gas to be dried (which has a higher temperature through the compression) can be branched off on the outlet side of the compressor and conducted to the regeneration zone for regeneration. In the design according to FIG. 1, this occurs via a connection line 17 without additional heating of the partial stream. In the design according to FIG. 2, the partial stream is first further heated using an active heating installation 31, such as an electrical heater. In the design according to FIG. 3, the partial stream 51 is first further split into a first partial stream 52 and a second partial stream 53, whereby only the first stream 52 is further heated using a heating installation 54. The first and second partial streams 52, 53 are conducted separately to different zones of the regeneration zone 13, as shown in the figure.

Figure 4:
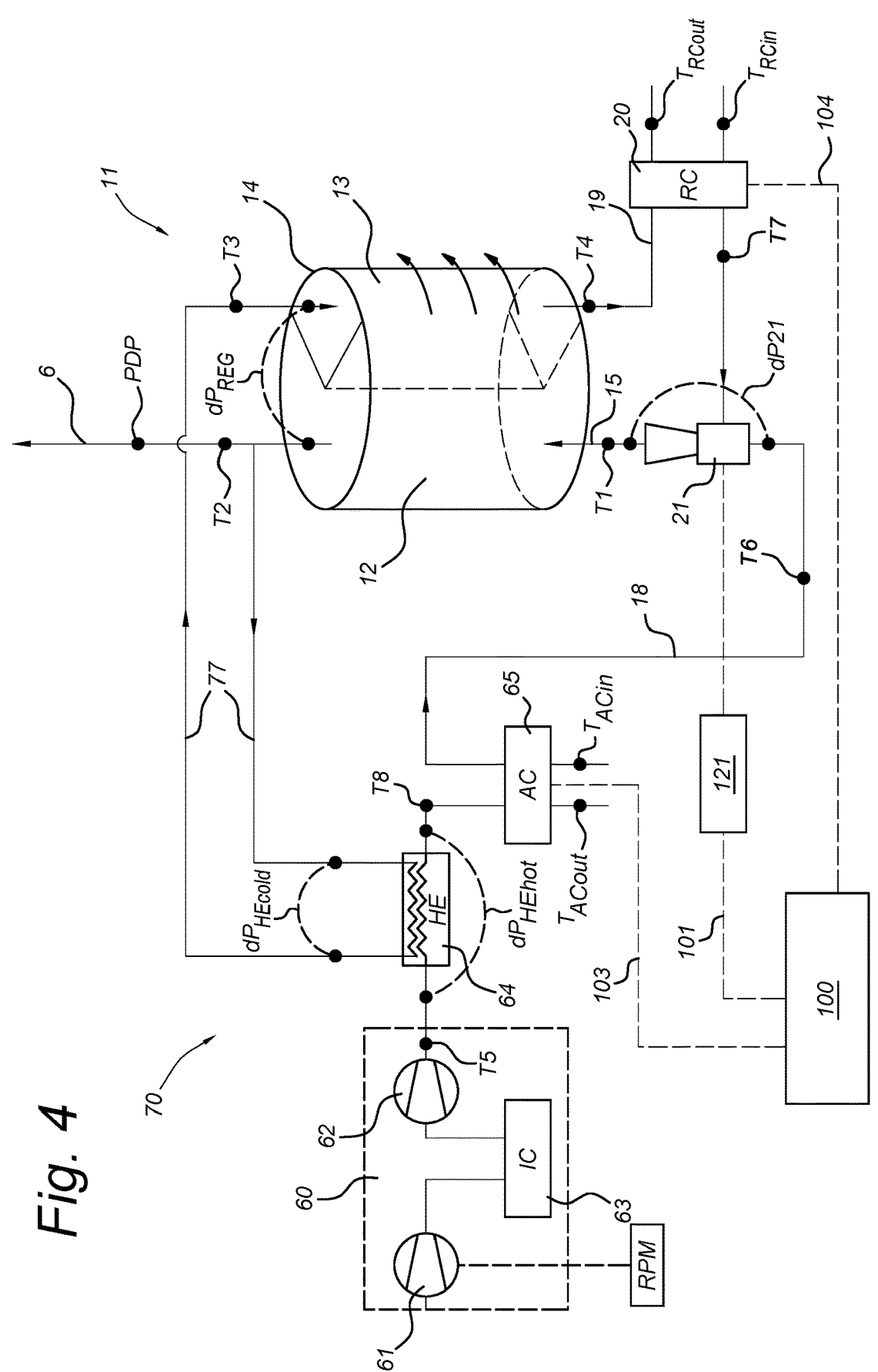
FIG. 4 shows a fourth design of a compressor installation including a dryer according to the invention.
Figure 5:
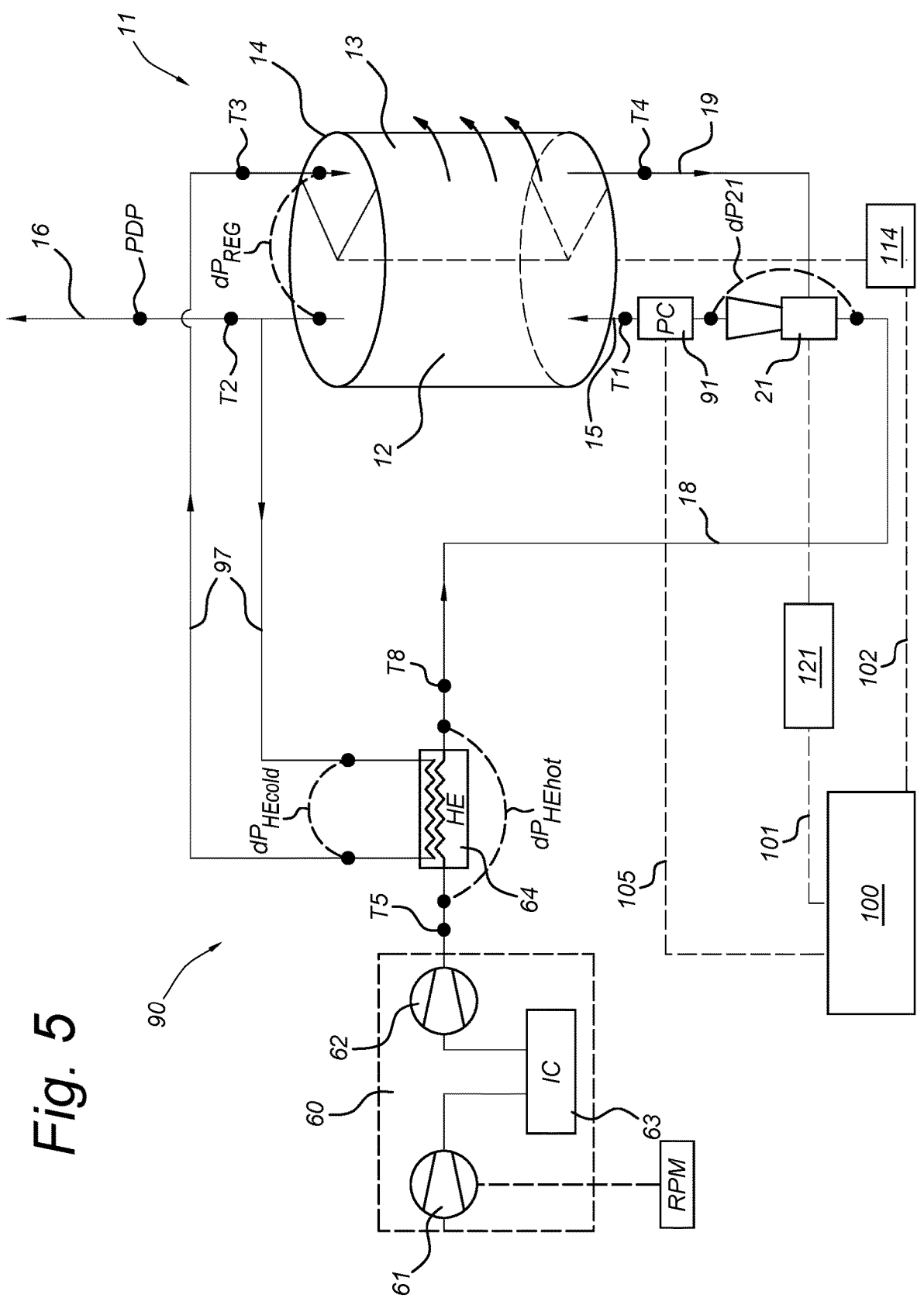
FIG. 5 shows a fifth design of a compressor installation including a dryer according to the invention.

In the designs according to FIGS. 4 and 5, at the outlet side of the dryer there is a connection line 77; 97 equipped to branch off a partial stream of the dried compressed gas. This partial stream is led through the heat exchanger 64 for the warming using the heat present in the supply stream by compression, and then further conducted to the regeneration zone 13.

In each of the designs according to FIG. 1 through 5, the partial stream used for regeneration is recombined with the main line 18 via a connection line for the supply stream of the compressed gas to be dried. This occurs via adjustable means such as a venturi ejector 21 or other adjustable means of creating a pressure difference and maintaining the partial stream for regeneration, as described further here. In the connection line 19, the main line 18 and/or on the inlet 15

(after the mixture), one or more cooling elements can be installed, such as for example the shown aftercooler 65 (AC), regeneration cooler 20 (RC) and/or process cooler 91 (PC) which can also be provided to cool the relevant stream of gas using a coolant such as cooling water or ice water.

In the designs shown according to FIG. 1 through 5, the following sensors can be provided for measuring the temperature of the relevant stream of compressed gas:

T1: temperature sensor at the inlet 15;

T2: temperature sensor at the outlet 16;

T3: temperature sensor at the inlet side of the regeneration zone 13;

T4: temperature sensor at the outlet side of the regeneration zone 13;

T5: temperature sensor at the outlet side of the compressor/inlet side of the heat exchanger 64 or aftercooler 65;

T6: temperature sensor in the main line 18 (between aftercooler 65 and venturi ejector 21);

T7: temperature sensor in the main line 19 (between regeneration cooler 20 and venturi ejector 21);

T8: temperature sensor at the outlet side of the heat exchanger 64.

In the designs shown according to FIG. 1 through 5, the following pressure sensors can be provided for the measurement of a pressure difference in the relevant flow of compressed gas over the relevant element, which is also a measurement for the relevant flow:

dP21: pressure sensors for measuring the pressure difference over the venturi ejector 21 (see also FIG. 6):

$dP_{REG}$: pressure sensors for measuring the difference in pressure between the outlet side of the drying zone 12 and the inlet side of the regeneration zone 13;

$dP_{HEhot}$: pressure sensors for measuring the pressure difference caused by the heat exchanger 64 in the supply stream of compressed air to be dried by the compressor 60.

$dP_{HEcold}$: pressure sensors for measuring the pressure difference caused by the heat exchanger 64 in the partial stream branched off for regeneration.

In the designs shown according to FIG. 1 through 5, the following sensors may also be used:

RPM: sensor for the measurement of the speed of the compressor 60, which is a measurement of the flow of the supply of gas to be dried;

PDP: pressure dewpoint sensor for measuring the pressure dewpoint at the outlet 16.

$T_{Acin}$ and $T_{ACout}$: temperature sensors for measuring the temperature of the coolant (cooling water) at the inlet and outlet of the aftercooler 65;

$T_{Rcin}$ and $T_{RCout}$: temperature sensors for measuring the temperature of the coolant (cooling water) at the inlet and outlet of the regeneration cooler 20;

$T_{PCin}$ and $T_{PCout}$: temperature sensors for measuring the temperature of the coolant (cooling water) at the inlet and outlet of the process cooler 91.

In the designs shown according to FIG. 1 through 5 there is always a control unit 100. Each of the aforementioned sensors can be connected to communicate with this control unit 100. The communicative connection can be wireless or wired in and is not shown in FIG. 1 through 5 for reasons of clarity.

In the designs shown according to FIG. 1 through 5 also at least the combination means that combine the partial flow used for regeneration with the main stream of gas to be dried are designed as adjustable means 21, 121. The control unit 100 is equipped at least for the processing of the at least one measurement value, provided by the aforementioned sensors, the determination of a first control signal 1010 for the aforementioned adjustable means based on the at least one measurement value, and the installation of the first control signal on the aforementioned adjustable means. The adjustable means can include, for example a venturi ejector 21 with an adjustable opening (see FIG. 6). The adjustable means can also include a blower with a regulator for the speed of the blower, or a number of smaller, parallel installed venturi ejectors or nozzles with a regulator to open or close these separately. An advantage of this can be that the scope of the adjustable means can be smaller than that of a single venturi ejector and as a result can be better integrated into the pressure vessel. An additional alternative for the adjustable means can be a venturi ejector with an adjustable bypass over the ejector. Other adjustable means are also possible.

In the design according to FIG. 1, the first control signal 101 is at least determined based on the RPM sensor (speed of compressor~delivered flow of compressed gas) and the dP21 sensor (pressure loss over venturi ejector 21~flow of partial stream), meaning the flow of the partial stream branched off for regeneration is at least regulated based on these two measurement values. In the design according to FIGS. 2 and 3, the first control signal 101 is further determined based on the temperature sensors T1 through T7 and the pressure dewpoint sensor PDP. In alternative designs, one or more of the temperature sensors and the pressure dewpoint sensor are present in the compressor installation in FIG. 2 and/or the control unit 100 can also be equipped for the determination or installation of a second and/or third control signal for the rotation speed of the drum with regard to the symmetrical rotation part of the pressure vessel and/or the one or more cooling units (same as FIGS. 4 and 5) and/or other control signals.

In designs according to FIGS. 4 and 5, the control unit can be equipped for the determination and installation of a first control signal 101, and a second control signal 102 and/or at least a third control signal 103, 104, 105. These control signals are determined by the control unit based on one or more measurement values from the following sensors: the RPM sensor (speed of compressor~delivered flow of compressed gas), dP21 (pressure loss over venturi ejector 21~flow of partial stream), dP$_{REG}$ (pressure loss between the outlet zone of the drying zone 12 and the inlet side of the regeneration zone 13), dP$_{HEhot}$ (pressure loss in the main stream over the heat exchanger 64), dP$_{HEcold}$ (pressure loss in the partial stream over the heat exchanger 64), one or more of T1 through T8, pressure dewpoint sensor PDP.

In further designs (not shown), the control unit 100 is connected to communicate with a remote computer system, such as for remote monitoring and/or adjusting software and the like.

Figure 6:
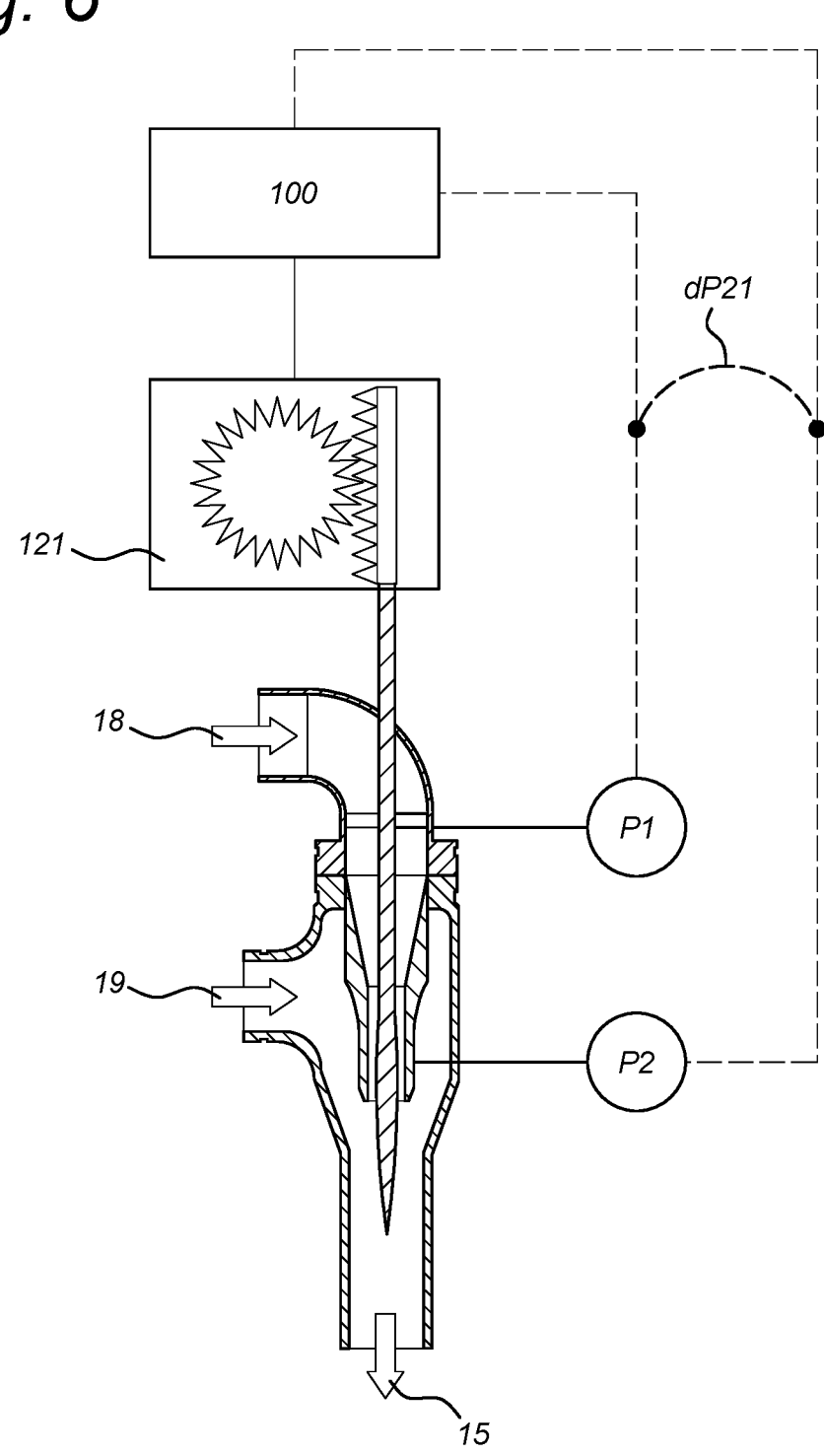
FIG. 6 shows a detail of a design of possible adjustable means for use in the designs in FIG. 1 through 5.

FIG. 6 shows a detail of the control of the adjustable means, here the venturi ejector 21 with adjustable opening according to the designs of the invention. The venturi ejector includes in this design an adjustable opening that is operated by an actuator rod with a cog actuator 121. The figure shows the measurement of the pressure loss caused by the adjustable opening in the main stream 18 of gas to be dried using pressure sensors P1 and P2, which communicate with the control unit 100. Based on this, this determines the first control signal 101 that is installed on the actuator 121. By changing the position of the adjustable opening, the pressure loss is changed and as a result, the suction of the partial stream used for regeneration 19. In this way, the flow of the partial stream used for regeneration is adjusted.

As listed above, in each of the designs according to FIG. 1 through 5, actuators 114 are provided to rotate the drum 14 with regard to the symmetrical rotating part of the pressure vessel 11. These can contain a motor, preferably an electric motor, preferably equipped with a start/stop switch and preferably controlled using the second control signal 102 of the control unit 100.

The start/stop switch is provided to switch the motor on and off, to achieve an adjustable average rotation speed of the drum with regard to the symmetrical rotational part. More precisely, the start/stop switch is provided to switch the motor on and off during the preferably continual function of the dryer, whereby on the one side, a continual flow of compressed gas is supplier and dried in the drying zone and on the other hand, a continual (partial) stream of the compressed gas to be dried is conducted to the regeneration zone for the regeneration of the drying agent. This start/stop switch is more economically beneficial than a frequency regulator to adjust the rotation speed of an electric motor and can thus be a cost saving in the area of investment costs. In addition, a start/stop switch is less complex, because it contains fewer control electronics. The start/stop switch must namely only turn the motor on and off according to a desired duty cycle (on/off ratio) to arrive at the desired average rotation speed of the drum. In addition, the start/stop switch makes it possible to have the drum rotate in phases with regard to the symmetrical rotation part, and so, for example, constantly precisely move one section the size of the regeneration zone or a part of it, and this section can then be stopped for a certain period. The start/stop switch has the additional advantage that the range of the average speed is broader than with a frequency regulator, namely, the average speed can be adjusted from 0 to the maximum speed of the motor.

Figure 7A:
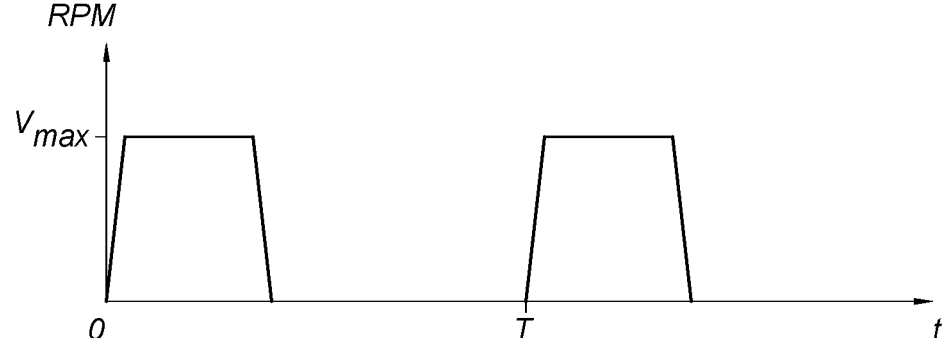
FIGS. 7A and 7B show examples of a possible start/stop switch for actuation of the drum in the designs in FIG. 1 through 5.
Figure 7B:
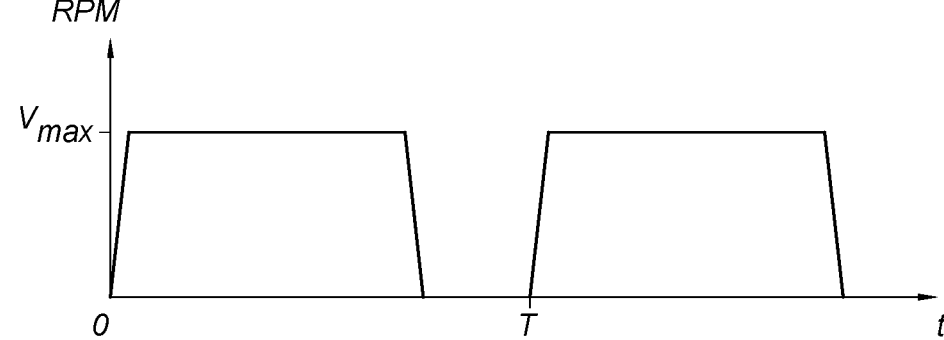

FIG. 7A-B shows a few examples of the start/stop switch, whereby in FIG. 7A, resp. FIG. 7B, the average speed ⅓, resp. ⅔ is of the maximum speed V. of the motor. The duty cycle has a period T. The average speed can be varied by varying the time that the motor is "on" within the period T. The average speed can also be varied by keeping the time that the motor is "on" constant and varying the time that the motor is "off" (which means that the length of the duty cycle T is variable).

Examples of Application

In a first application, the design examples described herein can be used as follows. Gas of a relatively high temperature is conducted to the inlet 15 for the gas to be dried (such as air), which is saturated. A higher temperature T1 of this gas means a higher moisture content, which itself means that the drying drum 14 must remove more moisture from the gas, which then means that more regeneration is required and thus a higher flow of regeneration gas. By measuring temperature T1, which can vary according to the environmental temperature of a compressor installation, one has a measurement for the moisture content of the gas conveyed to the inlet 15. The control unit 100 regulates the flow of the regeneration stream (the partial stream used for regeneration) depending on T1, more specifically the control unit increases this flow as T1 increases, such as according a pre-set table or regulation characteristic. Feedback on the proper function of the dryer is measured using the pressure dewpoint sensor PDP on the outlet 16.

In a second application, the design examples described herein can be used as follows. If the flow of the regeneration stream varies, such as to keep a pressure dewpoint PDP stable or within a particular range, or depending on the pressure fluctuations, it may be desirable to adjust the cooling of the output regeneration stream 19 and/or the rotation speed of the drum to the flow of the regeneration stream. By measuring the pressure loss over the venturi ejector 21, one has a measurement for the flow of the regeneration stream. The control unit can, for example, regulate the flow of cooling water through the cooling unit 20, which cools the outcoming regeneration stream or the cooling unit 91 that cools the combined flow (regeneration and gas to be dried added) to cool more if the regeneration stream increases and thus avoids that there is too little cooling through the increase in the flow of the regeneration stream. The control unit 100 can, whether or not in combination with this, regulate the rotation speed of the drum 14 according to the flow of the regeneration stream to optimize the mutual ratio. With this, the control unit can take into consideration the age of the drying agent and adjust the speed of the drum to a reduced regeneration capacity and/or absorption capacity of the drying agent.

The invention claimed is:

1. A dryer for compressed gas, comprising:
a pressure vessel comprising a rotation symmetrical part including a drying zone and a regeneration zone;
a drum set up in the rotation symmetrical part provided with a regenerable drying agent;
driving means for the rotation of said drum relative to the rotation symmetrical part, or vice versa, so that the drying agent is moved successively through the drying zone and the regeneration zone;
an inlet for the supply of compressed gas to be dried;
an outlet for the discharge of dried compressed gas;
a first connection line for tapping-off a partial stream of the compressed gas to be dried or the dried compressed gas and sending this partial stream to the regeneration zone;
adjustable means provided for mixing the partial stream used for regeneration with the supply stream of the compressed gas to be dried and regulation of the flow of the partial stream relative to the added supply stream;
wherein the dryer further comprises a sensor set with one or more sensors for direct or indirect measurement of the flow of the supply stream and/or the partial stream, and a control unit connected to communicate with the one or more sensors and said adjustable means and provided for processing measured values of the flow of the supply stream and/or the partial stream, determining a first control signal for said adjustable means based on the measured values, and providing the first control signal to said adjustable means.

2. The dryer according to claim 1, wherein the dryer comprises at least one cooling unit provided for the cooling of the compressed gas in the supply stream, the partial stream used for regeneration and/or the combined stream, and the sensor set comprises at least one or more of the following sensors: temperature sensors for measuring the temperature of the relevant stream before and/or after the relevant cooling unit, pressure sensors for measuring a drop in pressure caused by the relevant cooling unit in the relevant stream, and temperature sensors for measuring the temperature of the a coolant used for cooling before and/or after the cooling unit.

3. The dryer according to claim 1, wherein the adjustable means include a venturi ejector, positioned to unite the partial stream and the supply stream and provided with an adjustable opening and an actuator for the actuation of the adjustable opening based on the first control signal.

4. The dryer according to claim 1, wherein the adjustable means have a number of smaller, parallel arranged venturi ejectors or nozzles with a regulator to open or close these separately.

5. The dryer according to claim 1, wherein the adjustable means have a venturi ejector with an adjustable bypass over the ejector.

6. The dryer according to claim 1, wherein the control unit is connected to communicate with the actuators for the rotation of the drum with regard to the symmetrical rotation part of the pressure vessel, and the control unit is provided for the determination of a second control signal for these actuators based on the at least one measurement value and the application of the second control signal on these actuators.

7. The dryer according to claim 2, wherein the control unit is connected to communicate with one or more of the at least one cooling unit and is provided for the determination of at least a third control signal for this at least one cooling unit based on the at least one measurement value and the application of the third control signal on these actuators.

8. The dryer according to claim 1, wherein the dryer also comprises a cooling element for cooling of the gas to be dried that is sent to the drying zone, using a first coolant, and said cooling element comprises a first cooling circuit, provided for the cooling of the gas to be dried with a first coolant, and a second cooling circuit downstream of the first cooling circuit, provided for further cooling of the gas to be dried with a second coolant of a lower temperature than the first coolant.

9. The dryer according to claim 8, wherein said first and second coolants of said cooling element are the same coolants and the dryer comprises an additional second circuit for cooling of the second coolant before the second cooling circuit.

10. The dryer according to claim 1, wherein the dryer comprises a de-mister, installed on the inlet side of the drying zone for the removal of droplets from the gas to be dried, and the pressure vessel comprises a maintenance hatch in a wall of the pressure vessel at the location of the de-mister.

11. A compressor installation, comprising a compressor and a dryer according to claim 1.

12. A dryer for compressed gas, comprising:
a pressure vessel comprising a rotation symmetrical part including a drying zone and a regeneration zone;
a drum set up in the rotation symmetrical part provided with a regenerable drying agent;
driving means for the rotation of said drum relative to the rotation symmetrical part, or vice versa, so that the drying agent is moved successively through the drying zone and the regeneration zone;
an inlet for the supply of compressed gas to be dried;
an outlet for the discharge of dried compressed gas;
a first connection line for tapping-off a partial stream of the compressed gas to be dried or the dried compressed gas and sending this partial stream to the regeneration zone; adjustable means provided for mixing the partial stream used for regeneration with the supply stream of the compressed gas to be dried and regulation of the flow of the partial stream relative to the added supply stream;
wherein dryer further comprises a sensor set with at least one or more of the following sensors: an RPM sensor for measuring of the speed of a compressor that provides the supply stream, and pressure sensors to measure a fall in pressure over the adjustable means, and a control unit connected to communicate with the one or more sensors and said adjustable means and provided for processing measured values of the speed of the compressor and/or the fall in pressure over the adjustable means, determining a first control signal for said adjustable means based on the measured values, and providing the first control signal to said adjustable means.

13. A dryer for compressed gas, comprising:

a pressure vessel comprising a rotation symmetrical part including a drying zone and a regeneration zone;

a drum set up in the rotation symmetrical part provided with a regenerable drying agent;

driving means for the rotation of said drum relative to the rotation symmetrical part, or vice versa, so that the drying agent is moved successively through the drying zone and the regeneration zone;

an inlet for the supply of compressed gas to be dried;

an outlet for the discharge of dried compressed gas;

a first connection line for tapping-off a partial stream of the compressed gas to be dried or the dried compressed gas and sending this partial stream to the regeneration zone; adjustable means provided for mixing the partial stream used for regeneration with the supply stream of the compressed gas to be dried and regulation of the flow of the partial stream relative to the added supply stream;

wherein dryer further comprises a sensor set with one or more of the following sensors: temperature sensors for measuring a temperature difference between the inlet side and outlet side of the drying zone, and a pressure dewpoint sensor at the level of the outlet for the measurement of a pressure dewpoint of the discharged stream of dried compressed gas, and a control unit connected to communicate with the one or more sensors and said adjustable means and provided for processing measured values of the temperature difference between the inlet side and outlet side of the drying zone, and/or the pressure dewpoint of the discharged stream of dried compressed gas, determining a first control signal for said adjustable means based on the measured values, and providing the first control signal to said adjustable means.

14. A dryer for compressed gas, comprising:

a pressure vessel comprising a rotation symmetrical part including a drying zone and a regeneration zone;

a drum set up in the rotation symmetrical part provided with a regenerable drying agent;

driving means for the rotation of said drum relative to the rotation symmetrical part, or vice versa, so that the drying agent is moved successively through the drying zone and the regeneration zone;

an inlet for the supply of compressed gas to be dried;

an outlet for the discharge of dried compressed gas;

a first connection line for tapping-off a partial stream of the compressed gas to be dried or the dried compressed gas and sending this partial stream to the regeneration zone;

adjustable means provided for mixing the partial stream used for regeneration with the supply stream of the compressed gas to be dried and regulation of the flow of the partial stream relative to the added supply stream;

wherein the first connection line is provided with a heat exchanger for heating the partial stream diverted for regeneration with the compressed gas to be dried supplied to the dryer, and wherein the dryer further comprises a sensor set with at least one or more of the following sensors: pressure sensors for measuring a pressure difference between the outlet side of the drying zone and the inlet side of the regeneration zone, and pressure sensors for measuring a loss of pressure caused by the heat exchanger in the partial stream and/or the supply stream, and a control unit connected to communicate with the one or more sensors and said adjustable means and provided for processing measured values of the pressure difference between the outlet side of the drying zone and the inlet side of the regeneration zone, and/or the loss of pressure caused by the heat exchanger in the partial stream, determining a first control signal for said adjustable means based on the measured values, and providing the first control signal to said adjustable means.

15. A method for drying compressed gas, using a dryer comprising a pressure vessel comprising a symmetrical rotating part enclosing a drying zone and a regeneration zone and a drum installed in the symmetrical rotating part, provided with a regenerable drying agent, whereby the method includes the following steps, rotating said drum relative to the rotation symmetrical part, or vice versa, using driving means, so that the drying agent is moved successively through the drying zone and the regeneration zone;

supplying the compressed gas to be dried via an inlet connected to an inlet side of the drying zone of the pressure vessel;

discharging the dried compressed gas via an outlet connected to the outlet side of the pressure vessel;

diverting a partial stream of the compressed gas supplied to be dried or the dried compressed gas, and guiding this partial stream to the regeneration zone using a first connection line;

using an adjustable means, mixing the partial stream used for regeneration with the supply stream of the compressed gas to be dried and regulating the flow of the partial stream in reference to the added supply stream;

wherein the dryer also comprises a sensor set with one or more sensors for direct or indirect measurement of the flow of the supply stream and/or the partial stream, and a control unit that communicates with the one or more sensors and said adjustable means, processes measured values of the flow of the supply stream and/or the partial stream, determines a first control signal for said adjustable means based on the measured values, and provides the first control signal to said adjustable means.

16. A method for drying compressed gas, using a dryer comprising a pressure vessel comprising a symmetrical rotating part enclosing a drying zone and a regeneration zone and a drum installed in the symmetrical rotating part, provided with a regenerable drying agent, whereby the method includes the following steps, rotating said drum relative to the rotation symmetrical part, or vice versa, using driving means, so that the drying agent is moved successively through the drying zone and the regeneration zone;

supplying the compressed gas to be dried via an inlet connected to an inlet side of the drying zone of the pressure vessel;

discharging the dried compressed gas via an outlet connected to the outlet side of the pressure vessel;

diverting a partial stream of the compressed gas supplied to be dried or the dried compressed gas, and guiding this partial stream to the regeneration zone using a first connection line; and using an adjustable means, mixing the partial stream used for regeneration with the supply stream of the compressed gas to be dried and regulating the flow of the partial stream in reference to the added supply stream;

wherein the dryer further comprises a sensor set with at least one or more of the following sensors: an RPM sensor for measuring of the speed of a compressor that provides the supply stream, and pressure sensors to measure a fall in pressure over the adjustable means, and a control unit that communicates with the one or more sensors and said adjustable means, processes measured values of the speed of the compressor and/or the fall in pressure over the adjustable means, determines a first control signal for said adjustable means based on the measured values, and provides the first control signal to said adjustable means.

17. A method for drying compressed gas, using a dryer comprising a pressure vessel comprising a symmetrical rotating part enclosing a drying zone and a regeneration zone and a drum installed in the symmetrical rotating part, provided with a regenerable drying agent, whereby the method includes the following steps, rotating said drum relative to the rotation symmetrical part, or vice versa, using driving means, so that the drying agent is moved successively through the drying zone and the regeneration zone;

supplying the compressed gas to be dried via an inlet connected to an inlet side of the drying zone of the pressure vessel;

discharging the dried compressed gas via an outlet connected to the outlet side of the pressure vessel;

diverting a partial stream of the compressed gas supplied to be dried or the dried compressed gas, and guiding this partial stream to the regeneration zone using a first connection line; and using an adjustable means, mixing the partial stream used for regeneration with the supply stream of the compressed gas to be dried and regulating the flow of the partial stream in reference to the added supply stream;

wherein the dryer further comprises a sensor set with one or more of the following sensors: temperature sensors for measuring a temperature difference between the inlet side and outlet side of the drying zone, and a pressure dewpoint sensor at the level of the outlet for the measurement of a pressure dewpoint of the discharged stream of dried compressed gas, and a control unit that communicates with the one or more sensors and said adjustable means, processes measured values of the temperature difference between the inlet side and outlet side of the drying zone, and/or the pressure dewpoint of the discharged stream of dried compressed gas, determines a first control signal for said adjustable means based on the measured values, and provides the first control signal to said adjustable means.

18. A method for drying compressed gas, using a dryer comprising a pressure vessel comprising a symmetrical rotating part enclosing a drying zone and a regeneration zone and a drum installed in the symmetrical rotating part, provided with a regenerable drying agent, whereby the method includes the following steps, rotating said drum relative to the rotation symmetrical part, or vice versa, using driving means, so that the drying agent is moved successively through the drying zone and the regeneration zone;

supplying the compressed gas to be dried via an inlet connected to an inlet side of the drying zone of the pressure vessel;

discharging the dried compressed gas via an outlet connected to the outlet side of the pressure vessel;

diverting a partial stream of the compressed gas supplied to be dried or the dried compressed gas, and guiding this partial stream to the regeneration zone using a first connection line; and using an adjustable means, mixing the partial stream used for regeneration with the supply stream of the compressed gas to be dried and regulating the flow of the partial stream in reference to the added supply stream;

wherein the dryer further comprises a sensor set with at least one or more of the following sensors: pressure sensors for measuring a pressure difference between the outlet side of the drying zone and the inlet side of the regeneration zone, and pressure sensors for measuring a loss of pressure caused by the heat exchanger in the partial stream and/or the supply stream, and a control unit that communicates with the one or more sensors and said adjustable means, processes measured values of the pressure difference between the outlet side of the drying zone and the inlet side of the regeneration zone, and/or the loss of pressure caused by the heat exchanger in the partial stream, determines a first control signal for said adjustable means based on the measured values, and provides the first control signal to said adjustable means.

* * * * *